United States Patent
Cao et al.

(10) Patent No.: US 10,866,744 B1
(45) Date of Patent: **\*Dec. 15, 2020**

(54) DETERMINING CAPACITY UTILIZATION IN A DEDUPLICATING STORAGE SYSTEM

(71) Applicant: PURE STORAGE, INC., Mountain View, CA (US)

(72) Inventors: Jianting Cao, Sunnyvale, CA (US);
Martin Harriman, Aptos, CA (US);
John Hayes, Mountain View, CA (US);
Cary Sandvig, San Jose, CA (US)

(73) Assignee: Pure Storage, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/400,152

(22) Filed: May 1, 2019

Related U.S. Application Data

(63) Continuation of application No. 15/967,250, filed on Apr. 30, 2018, now Pat. No. 10,310,753, which is a continuation of application No. 15/668,259, filed on Aug. 3, 2017, now Pat. No. 10,082,971, which is a continuation of application No. 15/419,471, filed on Jan. 30, 2017, now Pat. No. 9,804,779, which is a continuation of application No. 14/745,342, filed on Jun. 19, 2015, now Pat. No. 9,594,512.

(51) Int. Cl.
*G06F 12/00* (2006.01)
*G06F 3/06* (2006.01)

(52) U.S. Cl.
CPC .......... *G06F 3/0619* (2013.01); *G06F 3/0646* (2013.01); *G06F 3/0665* (2013.01); *G06F 3/0689* (2013.01); *G06F 3/0608* (2013.01); *G06F 3/0662* (2013.01)

(58) Field of Classification Search
CPC ............. G06F 3/06; G06F 12/00; G06F 13/00
USPC .................................. 711/100, 103, 154, 200
See application file for complete search history.

(56) References Cited

U.S. PATENT DOCUMENTS

| | | | |
|---|---|---|---|
| 5,678,025 A | 10/1997 | Ghori et al. | |
| 5,706,210 A | 1/1998 | Kumano et al. | |
| 5,717,632 A | 2/1998 | Richart et al. | |
| 5,799,200 A | 8/1998 | Brant et al. | |

(Continued)

FOREIGN PATENT DOCUMENTS

| | | |
|---|---|---|
| EP | 0725324 A2 | 8/1996 |
| WO | WO-2012/087648 A1 | 6/2012 |

(Continued)

OTHER PUBLICATIONS

Paul Sweere, *Creating Storage Class Persistent Memory with NVDIMM*, Published in Aug. 2013, Flash Memory Summit 2013, <http://ww.flashmemorysummit.com/English/Collaterals/Proceedings/2013/20130814_T2_Sweere.pdf>, 22 pages. Pcmag, Storage Array Definition, Published May 10, 2013.

(Continued)

*Primary Examiner* — Tuan V Thai

(57) ABSTRACT

Attributing consumed storage capacity among entities storing data in a storage array includes: identifying a data object stored in the storage array and shared by a plurality of entities, where the data object occupies an amount of storage capacity of the storage array; and attributing to each entity a fractional portion of the amount of storage capacity occupied by the data object.

20 Claims, 7 Drawing Sheets

(56) References Cited

U.S. PATENT DOCUMENTS

| | | |
|---|---|---|
| 5,933,598 A | 8/1999 | Scales et al. |
| 6,012,032 A | 1/2000 | Donovan et al. |
| 6,085,333 A | 7/2000 | DeKoning et al. |
| 6,510,500 B2 | 1/2003 | Sarkar |
| 6,643,641 B1 | 11/2003 | Snyder |
| 6,647,514 B1 | 11/2003 | Umberger et al. |
| 6,789,162 B1 | 9/2004 | Talagala et al. |
| 6,862,665 B2 | 3/2005 | Neefs |
| 6,886,082 B1 | 4/2005 | Furusho |
| 7,010,645 B2 | 3/2006 | Hetzler et al. |
| 7,089,272 B1 | 8/2006 | Garthwaite et al. |
| 7,107,389 B2 | 9/2006 | Inagaki et al. |
| 7,117,331 B2 | 10/2006 | Uchiumi et al. |
| 7,146,521 B1 | 12/2006 | Nguyen |
| 7,167,950 B2 | 1/2007 | Sakaguchi et al. |
| 7,334,124 B2 | 2/2008 | Pham et al. |
| 7,437,530 B1 | 10/2008 | Rajan |
| 7,493,424 B1 | 2/2009 | Bali et al. |
| 7,669,029 B1 | 2/2010 | Mishra et al. |
| 7,689,609 B2 | 3/2010 | Lango et al. |
| 7,743,191 B1 | 6/2010 | Liao |
| 7,783,852 B2 | 8/2010 | Lahiri et al. |
| 7,899,780 B1 | 3/2011 | Shmuylovich et al. |
| 8,042,163 B1 | 10/2011 | Karr et al. |
| 8,086,585 B1 | 12/2011 | Brashers et al. |
| 8,200,887 B2 | 6/2012 | Bennett |
| 8,271,700 B1 | 9/2012 | Annem et al. |
| 8,387,136 B2 | 2/2013 | Lee et al. |
| 8,437,189 B1 | 5/2013 | Montierth et al. |
| 8,465,332 B2 | 6/2013 | Hogan et al. |
| 8,527,544 B1 | 9/2013 | Colgrove et al. |
| 8,566,546 B1 | 10/2013 | Marshak et al. |
| 8,578,442 B1 | 11/2013 | Banerjee |
| 8,613,066 B1 | 12/2013 | Brezinski et al. |
| 8,620,970 B2 | 12/2013 | English et al. |
| 8,751,463 B1 | 6/2014 | Chamness |
| 8,762,642 B2 | 6/2014 | Bates et al. |
| 8,769,622 B2 | 7/2014 | Chang et al. |
| 8,800,009 B1 | 8/2014 | Beda, III et al. |
| 8,812,860 B1 | 8/2014 | Bray |
| 8,850,546 B1 | 9/2014 | Field et al. |
| 8,898,346 B1 | 11/2014 | Simmons |
| 8,909,854 B2 | 12/2014 | Yamagishi et al. |
| 8,931,041 B1 | 1/2015 | Banerjee |
| 8,949,863 B1 | 2/2015 | Coatney et al. |
| 8,966,198 B1 | 2/2015 | Harris et al. |
| 8,984,602 B1 | 3/2015 | Bailey et al. |
| 8,990,905 B1 | 3/2015 | Bailey et al. |
| 9,009,437 B1 | 4/2015 | Bjornsson et al. |
| 9,081,713 B1 | 7/2015 | Bennett |
| 9,124,569 B2 | 9/2015 | Hussain et al. |
| 9,134,922 B2 | 9/2015 | Rajagopal et al. |
| 9,189,334 B2 | 11/2015 | Bennett |
| 9,209,973 B2 | 12/2015 | Aikas et al. |
| 9,250,823 B1 | 2/2016 | Kamat et al. |
| 9,300,660 B1 | 3/2016 | Borowiec et al. |
| 9,311,182 B2 | 4/2016 | Bennett |
| 9,444,822 B1 | 9/2016 | Borowiec et al. |
| 9,507,532 B1 | 11/2016 | Colgrove et al. |
| 9,594,512 B1 * | 3/2017 | Cao ............... G06F 3/0619 |
| 9,612,774 B2 * | 4/2017 | Romanovskiy ..... G06F 12/0246 |
| 9,632,870 B2 | 4/2017 | Bennett |
| 9,710,275 B2 * | 7/2017 | Marathe ............ G06F 9/38 |
| 9,965,394 B2 * | 5/2018 | Romanovskiy ....... G06F 3/0661 |
| 2002/0013802 A1 | 1/2002 | Mori et al. |
| 2003/0145172 A1 | 7/2003 | Galbraith et al. |
| 2003/0191783 A1 | 10/2003 | Wolczko et al. |
| 2003/0225961 A1 | 12/2003 | Chow et al. |
| 2004/0080985 A1 | 4/2004 | Chang et al. |
| 2004/0111573 A1 | 6/2004 | Garthwaite |
| 2004/0153844 A1 | 8/2004 | Ghose et al. |
| 2004/0193814 A1 | 9/2004 | Erickson et al. |
| 2004/0260967 A1 | 12/2004 | Guha et al. |
| 2005/0160416 A1 | 7/2005 | Jamison |
| 2005/0188246 A1 | 8/2005 | Emberty et al. |
| 2005/0216800 A1 | 9/2005 | Bicknell et al. |
| 2006/0015771 A1 | 1/2006 | Van Gundy et al. |
| 2006/0129817 A1 | 6/2006 | Borneman et al. |
| 2006/0161726 A1 | 7/2006 | Lasser |
| 2006/0230245 A1 | 10/2006 | Gounares et al. |
| 2006/0239075 A1 | 10/2006 | Williams et al. |
| 2007/0022227 A1 | 1/2007 | Miki |
| 2007/0028068 A1 | 2/2007 | Golding et al. |
| 2007/0055702 A1 | 3/2007 | Fridella et al. |
| 2007/0109856 A1 | 5/2007 | Pellicone et al. |
| 2007/0150689 A1 | 6/2007 | Pandit et al. |
| 2007/0168321 A1 | 7/2007 | Saito et al. |
| 2007/0220227 A1 | 9/2007 | Long |
| 2007/0294563 A1 | 12/2007 | Bose |
| 2007/0294564 A1 | 12/2007 | Reddin et al. |
| 2008/0005587 A1 | 1/2008 | Ahlquist |
| 2008/0077825 A1 | 3/2008 | Bello et al. |
| 2008/0162674 A1 | 7/2008 | Dahiya |
| 2008/0195833 A1 | 8/2008 | Park |
| 2008/0270678 A1 | 10/2008 | Cornwell et al. |
| 2008/0282045 A1 | 11/2008 | Biswas et al. |
| 2009/0077340 A1 | 3/2009 | Johnson et al. |
| 2009/0100115 A1 | 4/2009 | Park et al. |
| 2009/0198889 A1 | 8/2009 | Ito et al. |
| 2010/0052625 A1 | 3/2010 | Cagno et al. |
| 2010/0211723 A1 | 8/2010 | Mukaida |
| 2010/0246266 A1 | 9/2010 | Park et al. |
| 2010/0257142 A1 | 10/2010 | Murphy et al. |
| 2010/0262764 A1 | 10/2010 | Liu et al. |
| 2010/0325345 A1 | 12/2010 | Ohno et al. |
| 2010/0332754 A1 | 12/2010 | Lai et al. |
| 2011/0072290 A1 | 3/2011 | Davis et al. |
| 2011/0125955 A1 | 5/2011 | Chen |
| 2011/0131231 A1 | 6/2011 | Haas et al. |
| 2011/0167221 A1 | 7/2011 | Pangal et al. |
| 2012/0023144 A1 | 1/2012 | Rub |
| 2012/0054264 A1 | 3/2012 | Haugh et al. |
| 2012/0079318 A1 | 3/2012 | Colgrove et al. |
| 2012/0131253 A1 | 5/2012 | McKnight et al. |
| 2012/0303919 A1 | 11/2012 | Hu et al. |
| 2012/0311000 A1 | 12/2012 | Post et al. |
| 2013/0007845 A1 | 1/2013 | Chang et al. |
| 2013/0031414 A1 | 1/2013 | Dhuse et al. |
| 2013/0036272 A1 | 2/2013 | Nelson |
| 2013/0071087 A1 | 3/2013 | Motiwala et al. |
| 2013/0145447 A1 | 6/2013 | Maron |
| 2013/0191555 A1 | 7/2013 | Liu |
| 2013/0198459 A1 | 8/2013 | Joshi et al. |
| 2013/0205173 A1 | 8/2013 | Yoneda |
| 2013/0219164 A1 | 8/2013 | Hamid |
| 2013/0227201 A1 | 8/2013 | Talagala et al. |
| 2013/0290607 A1 | 10/2013 | Chang et al. |
| 2013/0311434 A1 | 11/2013 | Jones |
| 2013/0318297 A1 | 11/2013 | Jibbe et al. |
| 2013/0332614 A1 | 12/2013 | Brunk et al. |
| 2014/0020083 A1 | 1/2014 | Fetik |
| 2014/0074850 A1 | 3/2014 | Noel et al. |
| 2014/0082715 A1 | 3/2014 | Grajek et al. |
| 2014/0086146 A1 | 3/2014 | Kim et al. |
| 2014/0090009 A1 | 3/2014 | Li et al. |
| 2014/0096220 A1 | 4/2014 | Da Cruz Pinto et al. |
| 2014/0101434 A1 | 4/2014 | Senthurpandi et al. |
| 2014/0164774 A1 | 6/2014 | Nord et al. |
| 2014/0173232 A1 | 6/2014 | Reohr et al. |
| 2014/0195575 A1 | 7/2014 | Haustein et al. |
| 2014/0195636 A1 | 7/2014 | Karve et al. |
| 2014/0201512 A1 | 7/2014 | Seethaler et al. |
| 2014/0201541 A1 | 7/2014 | Paul et al. |
| 2014/0208155 A1 | 7/2014 | Pan |
| 2014/0215590 A1 | 7/2014 | Brand |
| 2014/0229654 A1 | 8/2014 | Goss et al. |
| 2014/0230017 A1 | 8/2014 | Saib |
| 2014/0258526 A1 | 9/2014 | Le Sant et al. |
| 2014/0282983 A1 | 9/2014 | Ju et al. |
| 2014/0285917 A1 | 9/2014 | Cudak et al. |
| 2014/0325262 A1 | 10/2014 | Cooper et al. |
| 2014/0351627 A1 | 11/2014 | Best et al. |
| 2014/0373104 A1 | 12/2014 | Gaddam et al. |
| 2014/0373126 A1 | 12/2014 | Hussain et al. |

(56) References Cited

U.S. PATENT DOCUMENTS

| | | |
|---|---|---|
| 2015/0026387 A1 | 1/2015 | Sheredy et al. |
| 2015/0074463 A1 | 3/2015 | Jacoby et al. |
| 2015/0089569 A1 | 3/2015 | Sondhi et al. |
| 2015/0095515 A1 | 4/2015 | Krithivas et al. |
| 2015/0113203 A1 | 4/2015 | Dancho et al. |
| 2015/0121137 A1 | 4/2015 | McKnight et al. |
| 2015/0134920 A1 | 5/2015 | Anderson et al. |
| 2015/0149822 A1 | 5/2015 | Coronado et al. |
| 2015/0193169 A1 | 7/2015 | Sundaram et al. |
| 2015/0378888 A1 | 12/2015 | Zhang et al. |
| 2016/0098323 A1 | 4/2016 | Mutha et al. |
| 2016/0350009 A1 | 12/2016 | Cerreta et al. |
| 2016/0352720 A1 | 12/2016 | Hu et al. |
| 2016/0352830 A1 | 12/2016 | Borowiec et al. |
| 2016/0352834 A1 | 12/2016 | Borowiec et al. |
| 2017/0024142 A1 | 1/2017 | Watanabe et al. |

FOREIGN PATENT DOCUMENTS

| | | |
|---|---|---|
| WO | WO-2013071087 A1 | 5/2013 |
| WO | WO-2014/110137 A1 | 7/2014 |
| WO | WO-2016/015008 A1 | 12/2016 |
| WO | WO-2016/190938 A1 | 12/2016 |
| WO | WO-2016/195759 A1 | 12/2016 |
| WO | WO-2016/195958 A1 | 12/2016 |
| WO | WO-2016/195961 A1 | 12/2016 |

OTHER PUBLICATIONS

PCMAG, *Storage Array Definition*, Published May 10, 2013. <http://web.archive.org/web/20130510121646/http://www.pcmag.com/encyclopedia/term/52091/storage-array>, 2 pages.

Google Search of "storage array define" performed by the Examiner on Nov. 4, 2015 for U.S. Appl. No. 14/725,278, Results limited to entires dated before 2012, 1 page.

TECHOPEDIA, *What is a disk array*, techopedia.com (online), Jan. 13, 2012, 1 page, URL: web.archive.org/web/20120113053358/http://www.techopedia.com/definition/1009/disk-array.

WEBOPEDIA, *What is a disk array*, webopedia.com (online), May 26, 2011, 2 pages, URL: web/archive.org/web/20110526081214/http://www.webopedia.com/TERM/D/disk_array.html.

Li et al., *Access Control for the Services Oriented Architecture*, Proceedings of the 2007 ACM Workshop on Secure Web Services (SWS '07), Nov. 2007, pp. 9-17, ACM New York, NY.

Hota et al., *Capability-based Cryptographic Data Access Control in Cloud Computing*, International Journal of Advanced Networking and Applications, col. 1, Issue 1, Aug. 2011, 10 pages, Eswar Publications, India.

Faith, *dictzip file format*, GitHub.com (online), accessed Jul. 28, 2015, 1 page, URL: github.com/fidlej/idzip.

Wikipedia, Convergent Encryption, Wikipedia.org (online), accessed Sep. 8, 2015, 2 pages, URL: en.wikipedia.org/wiki/Convergent_encryption.

Storer et al., *Secure Data Deuplication*, Proceedings of the 4th ACM International Workshop on Storage Security And Survivability (StorageSS'08), Oct. 2008, 10 pages, ACM New York, NY. USA, DOI: 10.1145/1456469.1456471.

ETSI, *Network Function Virtualisation (NFV); Resiliency Requirements*, ETSI GS NFCV-REL 001, V1.1.1, Jan. 2015, 82 pages, etsi.org (online), URL: www.etsi.org/deliver/etsi_gs/NFV-REL/001_099/001/01.01.01_60/gs_NFV-REL001v010101p.pdf.

Microsoft, *Hybrid for SharePoint Server 2013—Security Reference Architecture*, Microsoft (online), Oct. 2014, 53 pages, URL: hybrid.office.com/img/Security_Reference_Architecture.pdf.

Microsoft, *Hybrid Identity*, Microsoft (online), Apr. 2014, 36 pages, URL: www.aka.ms/HybridIdentityWp.

Microsoft, *Hybrid Identity Management*, Microsoft (online), Apr. 2014, 2 pages, URL: download.microsoft.com/download/E/A/E/EAE57CD1-A80B-423C-96BB-142FAAC630B9/Hybrid_Identity_Datasheet.pdf.

Bellamy-McIntyre et al., *OpenID and the Enterprise: A Model-based Analysis of Single Sign-On Authentication*, 15th IEEE International Enterprise Distributed Object Computing Conference (EDOC), Aug. 29, 2011, pp. 129-138, IEEE Computer Society, USA, DOI: 10.1109/EDOC.2011.26, ISBN: 978-1-4577-0362-1.

Kong, *Using PCI Express As The Primary System Interconnect in Multiroot Compute, Storage, Communications And Embedded Systems*, White Paper, IDT.com (online), Aug. 28, 2008, 12 pages, URL: www.idt.com/document/whp/idt-pcie-multi-root-white-paper.

Hu et al., Container Marking: *Combining Data Placement, Garbage Collection and Wear Levelling for Flash*, 19th Annual IEEE International Symposium on Modelling, Analysis, and Simulation of Computer and Telecommunications Systems, Jul. 25-27, 2011, 11 pages, ISBN: 978-0-7695-4430-4, DOI: 10.1109/MASCOTS.2011.50.

International Search Report and Written Opinion, PCT/US2016/015008, dated May 4, 2016, 12 pages.

International Search Report and Written Opinion, PCT/US2016/020410, dated Jul. 8, 2016, 12 pages.

International Search Report and Written Opinion, PCT/US2016/032084, dated Jul. 18, 2016, 12 pages.

International Search Report and Written Opinion, PCT/US2016/016333, dated Jun. 8, 2016, 12 pages.

International Search Report and Written Opinion, PCT/US2016/032052, dated Aug. 30, 2016, 17 pages.

International Search Report and Written Opinion, PCT/US2016/035492, dated Aug. 17, 2016, 10 pages.

International Search Report and Written Opinion, PCT/US2016/036693, dated Aug. 29, 2016, 10 pages.

International Search Report and Written Opinion, PCT/US2016/038758, dated Oct. 7, 2016, 10 pages.

International Search Report and Written Opinion, PCT/US2016/040393, dated Sep. 22, 2016, 10 pages.

International Search Report and Written Opinion, PCT/US2016/044020, dated Sep. 30, 2016, 11 pages.

International Search Report and Written Opinion, PCT/US2016/044874, dated Oct. 7, 2016, 11 pages.

International Search Report and Written Opinion, PCT/US2016/044875, dated Oct. 5, 2016, 13 pages.

International Search Report and Written Opinion, PCT/US2016/044876, dated Oct. 21, 2016, 12 pages.

International Search Report and Written Opinion, PCT/US2016/044877, dated Sep. 29, 2016, 13 pages.

\* cited by examiner

DETERMINING CAPACITY UTILIZATION IN A DEDUPLICATING STORAGE SYSTEM

CROSS REFERENCE TO RELATED APPLICATIONS

This application is a continuation application of and claims priority from U.S. patent application Ser. No. 15/967,250, filed Apr. 30, 2018, which is a continuation application of and claims priority from U.S. patent application Ser. No. 15/668,259, filed Aug. 3, 2017, which claims priority from U.S. Pat. No. 9,804,779, issued Oct. 31, 2017, which claims priority from U.S. Pat. No. 9,594,512, issued Mar. 14, 2017.

TECHNICAL FIELD

The field of technology is data processing, or, more specifically, methods, apparatus, and products for providing authorization and authentication in a cloud for a user of a storage array.

BACKGROUND ART

Data centers may include many computing components including servers, network devices, and storage arrays. As the need for storage of large amounts of data and efficient access to that data increases, storage array technology is advancing. Such storage arrays may provide persistent storage for any number of computing devices in a data center. Given that many data centers provide services to many different users, various considerations must be taken into account to provide efficient, useful, and secure access to and administration of storage arrays.

In some storage arrays, storage capacity may be efficiently utilized between multiple entities by sharing of data. That is, data need not be written to two separate memory locations within storage if the data is the same. Deduplication schemes, for example, are configured to identify multiple instances of the same data and reduce the data to a single instance in storage. Entities sharing such data are typically unaware that such sharing has occurred. To that end, difficulties exist in reporting the amount of space utilized by such shared data to each of the entities.

SUMMARY OF INVENTION

Methods, apparatus, and products for attributing consumed storage capacity among entities storing data in a storage array are described in this specification. Such attribution includes identifying a data object stored in the storage array and shared by a number of entities. The data object occupies an amount of storage capacity of the storage array. Attributing consumed storage capacity among the entities may include attributing to each entity a fractional portion of the amount of storage capacity occupied by the data object.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DESCRIPTION OF EMBODIMENTS

Figure 1:
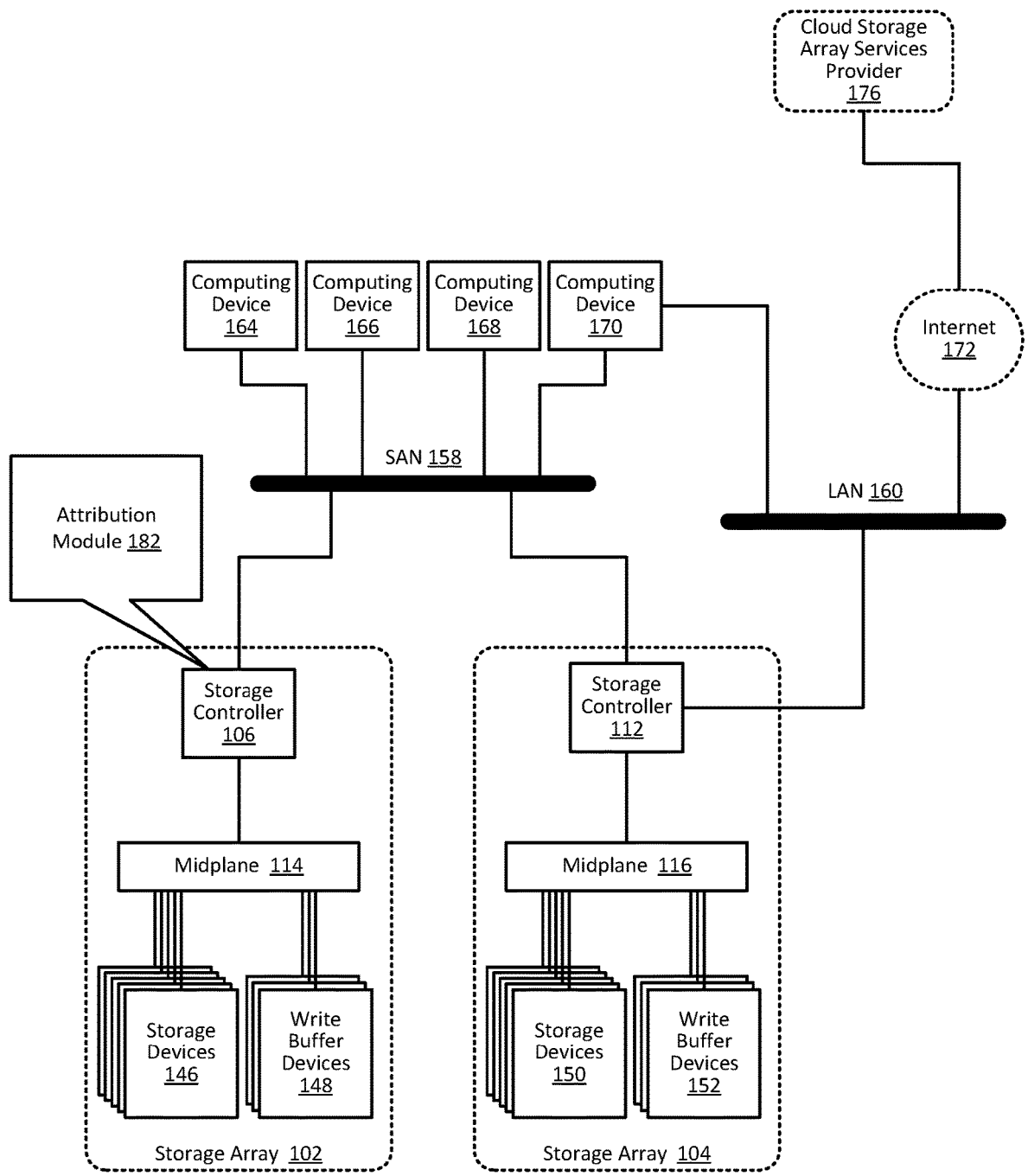
FIG. 1 sets forth a block diagram of a system configured for attributing consumed storage capacity among entities storing data in a storage array according to embodiments of the present invention.

Exemplary methods, apparatus, and products for attributing consumed storage capacity among entities storing data in a storage array in accordance with the present invention are described with reference to the accompanying drawings, beginning with FIG. 1. FIG. 1 sets forth a block diagram of a system configured for attributing consumed storage capacity among entities storing data in a storage array according to embodiments of the present invention. The system of FIG. 1 includes a number of computing devices (164, 166, 168, 170). Such computing devices may be implemented in a number of different ways. For example, a computing device may be a server in a data center, a workstation, a personal computer, a notebook, or the like.

The computing devices (164-170) in the example of FIG. 1 are coupled for data communications to a number of storage arrays (102, 104) through a storage area network (SAN) (158) as well as a local area network (160) (LAN). The SAN (158) may be implemented with a variety of data communications fabrics, devices, and protocols. Example fabrics for such a SAN may include Fibre Channel, Ethernet, Infiniband, SAS (Serial Attached Small Computer System Interface), and the like. Example data communications protocols for use in such a SAN (158) may include ATA (Advanced Technology Attachment), Fibre Channel Protocol, SCSI, iSCSI, HyperSCSI, and others. Readers of skill in the art will recognize that a SAN is just one among many possible data communications couplings which may be implemented between a computing device and a storage array. Any other such data communications coupling is well within the scope of embodiments of the present invention.

The local area network (160) of FIG. 1 may also be implemented with a variety of fabrics and protocols. Examples of such fabrics include Ethernet (802.3), wireless (802.11), and the like. Examples of such data communications protocols include TCP (Transmission Control Protocol), UDP (User Datagram Protocol), IP (Internet Protocol), HTTP (HyperText Transfer Protocol), WAP (Wireless Access Protocol), HDTP (Handheld Device Transport Protocol), SIP (Session Initiation Protocol), RTP (Real Time Protocol) and others as will occur to those of skill in the art.

The example storage arrays (102, 104) of FIG. 1 provide persistent data storage for the computing devices. Each storage array (102, 104) includes a storage controller (106, 112). The storage controller is a module of automated computing machinery comprising computer hardware, computer software, or a combination of computer hardware and software. The storage controller may be configured to carry out various storage-related tasks. Such tasks may include writing data received from a computing device to storage, erasing data from storage, retrieving data from storage to provide to a computing device, monitoring and reporting of disk utilization and performance, performing RAID (Redundant Array of Independent Drives) or RAID-like data redundancy operations, compressing data, encrypting data, and so on.

Each storage controller (106, 112) may be implemented in a variety of ways, including as an FPGA (Field Programmable Gate Array), a PLC (Programmable Logic Chip), an ASIC (Application Specific Integrated Circuit), or computing device that includes discrete components such as a central processing unit, computer memory, and various adapters. Each storage controller (106, 112) may, for example, include a data communications adapter configured to support communications via the SAN (158) and the LAN (160). Only one of the storage controllers (112) in the example of FIG. 1 is depicted as coupled to the LAN (160) for data communications for clarity. Readers should understand that both storage controllers (106, 112) are independently coupled to the LAN (160). Each storage controller (106, 112) may also, for example, include an I/O controller or the like that couples the storage controller (106, 112) for data communications, through a midplane (114), to a number of storage devices (146, 150), and a number of write buffer devices (148, 152) devices.

Each write buffer device (148, 152) may be configured to receive, from the storage controller (106, 112), data to be stored in the storage devices (146). Such data may originate from any one of the computing devices (164-170). In the example of FIG. 1, writing data to the write buffer device may be carried out more quickly than writing data to the storage device. The storage controller (106, 112) may be configured to effectively utilize the write buffer devices (148, 152) as a quickly accessible redundant buffer for data destined to be written to storage. In this way, if the storage device to which the data is to be written fails or if the write does not complete, the write buffer device may maintain the data to be written during a retry of the write or during failover of the storage device to another location. That is, the write buffer device may provide redundancy for the storage devices.

A 'storage device' as the term is used in this specification refers to any device configured to record data persistently. The term 'persistently' as used here refers to a device's ability to maintain recorded data after loss of a power source. Examples of storage devices may include mechanical, spinning hard disk drives, Solid-state drives ("Flash drives"), and the like.

In addition to being coupled to the computing devices through the SAN (158), the storage arrays may also be coupled to the computing devices through the LAN (160) and to one or more cloud service providers through the Internet (172). One example cloud service in FIG. 1 is a storage array services provider (176). The storage array service provider (176) may be configured to provide various storage array services such as reporting of storage array performance characteristics, configuration control of the storage arrays, and the like. The storage array services provider may rely on modules executing on the storage array itself to gather or process such data.

As mentioned above, the storage controllers (106, 112) of the storage arrays (102, 104) may be configured to carry out various storage-related tasks. In the example of FIG. 1, the storage controller (106) is configured to execute an attribution module (182) that attributes consumed storage capacity among entities storing data in a storage array in accordance with embodiment of the present invention. To that end, the attribution module (182) may identify a data object stored in the storage array and shared by a plurality of entities. The term 'entity' refers to anything that may be uniquely identified and to which storage capacity utilization may be attributed. Examples of such entities may include I/O (input/output) originators such as users, applications, operating systems and like, snapshots, memory regions, and so on.

A data object may be 'shared' between multiple entities without the entities' knowledge. Consider, for example, deduplicated data. In a concise example, when two memory regions contain identical data, the data may be deduplicated such that one only one memory region contains the data and references are created for both entities that originally stored that data. In this way, each entity that originally stored the data need not be aware that the data is stored in only a single location and effectively 'shared' among the entities. Reads of that memory region may be directed by the storage controller or other device that maintains deduplicated data tables, to the one remaining storage region containing the actual data.

The data object that is shared amongst a plurality of entities does occupy some amount of storage capacity of the storage array. To that end, the attribution module (182) may attribute to each entity sharing the data object, a fractional portion of the amount of storage capacity occupied by the data object. In this specification the term 'fractional portion' refers to a number less than the total amount of storage capacity consumed by the shared data object. Consider, for example a 1 Gigabyte file stored once by a first user in a storage array and once by a second user in the storage array. In this example, once the 1 GB file is deduplicated and stored in only a single instance, each user may be attributed a fractional portion of the amount of storage capacity consumed by the 1 GB file equal to half of the 1 GB file.

It is noted that the description above with respect to attribution of shared data objects may not include an attribution of all data objects associated with a particular entity. A particular entity for example may, in addition to sharing data objects, store unique data objects objects that are not shared by any other entity. The attribution module (182) may therefore report not only attribute fractional portions of shared data objects to a particular entity, but also the entire storage space consumed by unique data objects associated with the particular entity.

The arrangement of computing devices, storage arrays, cloud-based service providers, networks and other devices making up the exemplary system illustrated in FIG. 1 are for explanation, not for limitation. Systems useful according to various embodiments of the present invention may include different configurations of servers, routers, switches, computing devices, and network architectures, not shown in FIG. 1, as will occur to those of skill in the art.

Attributing consumed storage capacity among entities storing data in a storage array in accordance with embodiments of the present invention is generally implemented with computers. In the system of FIG. 1, for example, all the computing devices (164-170), storage controllers (106, 112), and storage array services provider (176) may be implemented, to some extent at least, as computers. For further explanation, therefore, FIG. 2 sets forth a block diagram of an example storage controller (106) of a storage array (102). The example storage controller includes a computer processor (214). The computer processor is coupled to RAM (218) through a DDR4 (Double-Data Rate 4) bus.

Stored in RAM (218) is an attribution module configured for attributing consumed storage capacity among entities storing data in a storage array (102). The attribution module (182) may identify a data object (184) stored in the storage array (102) and shared by a plurality of entities. The data object occupies a particular amount of storage capacity of the storage array.

The attribution module (182) may then attribute to each entity a fractional portion of the amount of storage capacity occupied by the data object. The attribution module (182) may carry out such attribution by, for each entity sharing the data object: identifying a number of references (186, 188, 190, 192, 194), generated by the entity, to the data object (184); calculating an entity-specific proportion (240, 244) of the number of references generated by the entity relative to a total number of references to the data object; and calculating the product (242, 246) of the entity-specific proportion and the amount of storage capacity occupied by the data object.

Figure 2:
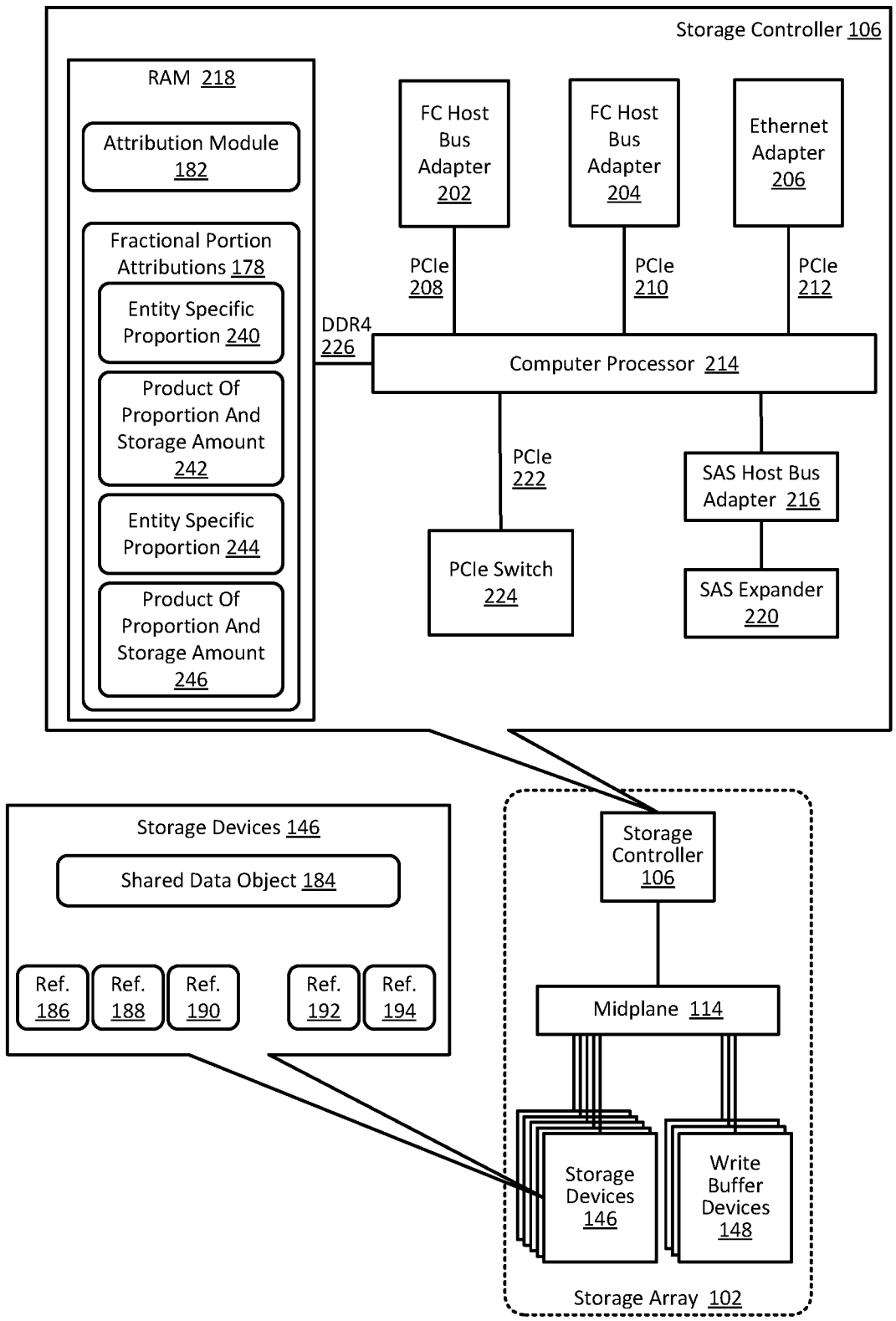
FIG. 2 sets forth a block diagram of an example storage controller of a storage array configured for attributing consumed storage capacity among entities storing data in a storage array according to embodiments of the present invention.

A 'reference' as the term is used in this specification is a type of pointer to the shared data object. For each instance an entity stores the shared data object, a reference is a created. This reference may be used by the storage controller to direct read, write, erase, and copy access requests to the actual location of the shared data object as the entity associated with the shared data object may be unaware of the exact location at which the data object is stored. In the example of FIG. 2, consider that one entity has three references (186, 188, 190) to the shared data object (184) and another entity has two references (192, 194). To attribute a fractional portion of the amount of storage capacity occupied by the shared data object (184) amongst the two entities, the attribution module may first calculate a entity-specific proportion of the number of references generated by each entity. One entity may have an entity-specific proportion (240) of ⅗ and the other entity may have an entity-specific proportion (244) of ⅖. The attribution module (182) may then calculate the product of each entity-specific proportion and the total of amount of storage capacity consumed by the shared data object. Consider, as an example, that the amount of storage capacity consumed by the shared data object is 1 GB. Continuing with this example the product (242) of the entity-specific proportion (240) of ⅗ and 1 GB is 600 Megabytes (MB), and the product (246) of entity-specific proportion (244) of ⅖ and 1 GB is 400 MB. In this way, each entity is attributed a fractional portion of the total amount of storage capacity actually consumed by the shared data object (182).

Over time, the number of references to a particular shared data object by a particular entity may change. References may be lost for a variety of reasons. An overwrite of the data object, for example, in which the data is no longer identical between two entities may result in a loss of references associated with entity causing the overwrite. A 'trim' function, which results in freeing storage space but does not actually result in erasing or overwriting the data may result in a loss of reference to data stored in that storage location. Resizing a volume may also result in a loss of references to data objects stored in the portion of the volume that was lost due to the resizing. It should be noted that the data objects stored in the portion of the volume lost due to resizing need not be actually erased or overwritten. The result, however, from the point of the entity, is the same: the reference to that data object is lost. In each case, when references to a shared data object are lost, the fractional attribution of the amount of storage capacity consumed by that shared data object is no longer the same. As such, the attribution module (182) of the example of FIG. 2 may be configured, upon a loss of references by an entity to the shared data object, to recalculate, for the entity, the fractional portion of the amount of storage capacity occupied by the data object. Such recalculation may occur exactly as described above with respect to calculating an entity-specific proportion of references generated by the entity relative to the total number of references (generated by all entities) to the shared data object and calculating the product of that proportion to the total storage amount consumed by the shared data object.

The processor (214), in the example of FIG. 2, is also coupled for data communications through PCIe (Peripheral Component Interface express) links (208, 210, 212, 222) to several Fibre Channel host bus adapters (202, 204), an Ethernet adapter (206), and a PCIe switch (224). The Fibre Channel host bus adapters (202, 204) may couple the storage controller to a storage area network, such the SAN (158) depicted in the example of FIG. 1. The Ethernet adapter (206) may couple the storage controller to a local area network such as the LAN (160) depicted in the example of FIG. 1. The PCIe switch (224) may provide data communications across other PCI links through the midplane to PCI endpoints, such as storage devices or write buffer devices. Likewise, the processor (214) is also coupled through a SAS (Serial Attached SCSI) host bus adapter (216) to a SAS expander (220). The SAS expander may provide SAS connections between the computer processor (214) and other devices through the midplane.

Readers of skill in the art will recognize that these components, protocols, adapters, and architectures are for illustration only, not limitation. Such a storage controller may be implemented in a variety of different ways. Each such way is well within the scope of the present invention.

Figure 3:
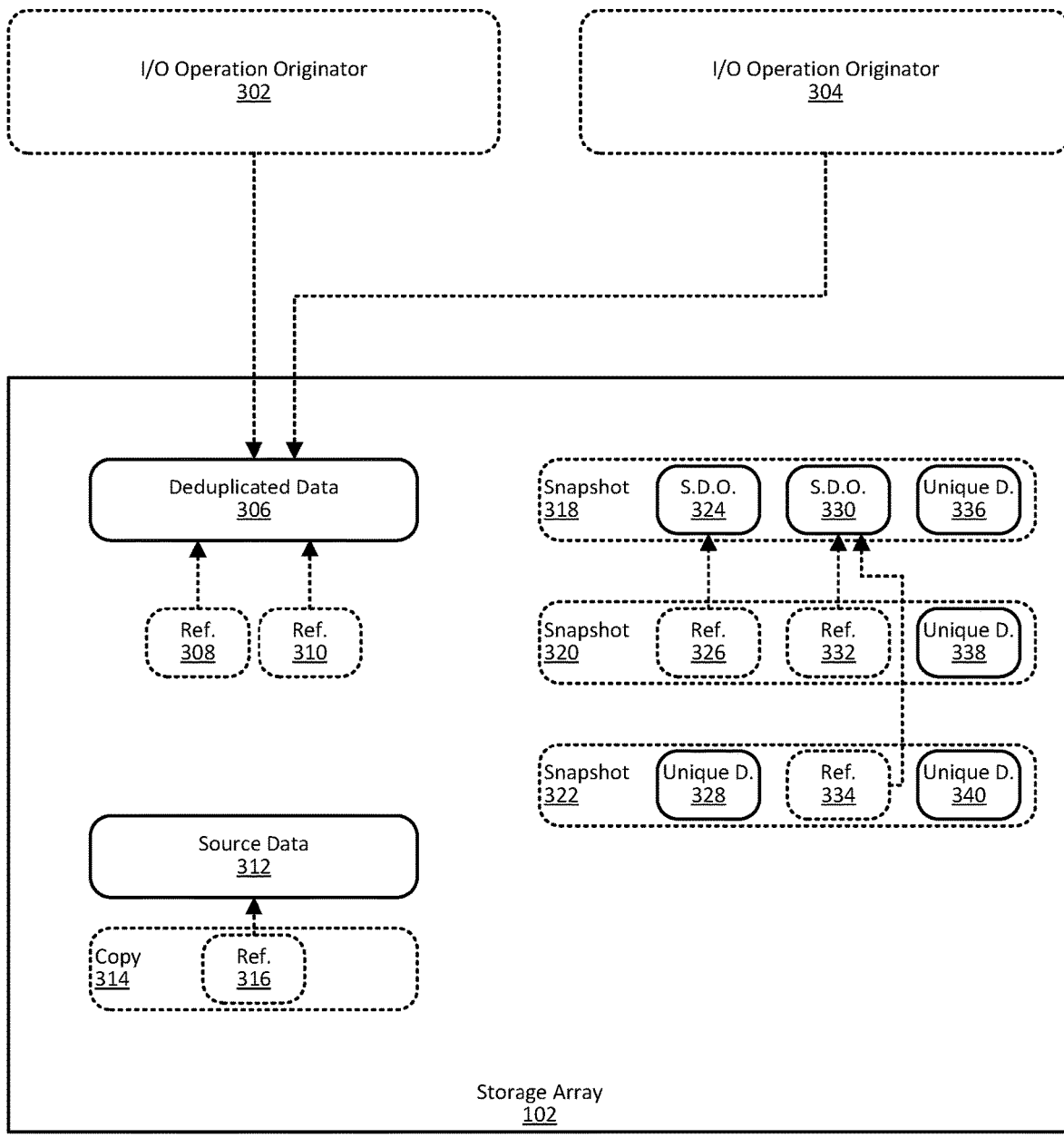
FIG. 3 sets forth a block diagram of an example system having a plurality of entities sharing data objects in a storage array for which consumed storage capacity is attributed among the entities according to embodiments of the present invention.

For further explanation, FIG. 3 sets forth a block diagram of an example system having a plurality of entities sharing data objects in a storage array for which consumed storage capacity is attributed among the entities according to embodiments of the present invention. More specifically, the block diagram of FIG. 3 sets forth three examples of entities and the types of data objects which may be shared amongst those entities.

In one example, a shared data object may be deduplicated data (306) referenced (308, 310) by a plurality of I/O operation originators (302, 304). An I/O operation originator may be any source of I/O, whether the original source or whether an abstraction of a source. An I/O operation originator may be a virtual machine, an operating system, an application, a volume, a particular computer hardware component, a particular I/P source, a particular MAC hardware address, a particular user, or so on. In the example of FIG. 3, each I/O operation originator (302, 304) each has a single reference (308, 310) to the deduplicated data (306). As such, each of the I/O operation originators may be attributed a fractional portion of half of the amount of storage capacity occupied by the deduplicated data.

In another example in FIG. 3, a shared data object may be data shared between a number of subsequent snapshots. A 'snapshot' as the term is used here refers to a capture of data in a particular memory region of the storage device at a particular time. In many subsequent captured snapshots may include identical data. To that end, the module that performs the snapshot operation may be configured to not duplicate data from one snapshot to the next. Instead, a reference to the original data (which would otherwise be duplicated in subsequent snapshots) is included in the subsequent snapshot. In the example of FIG. 3, three subsequent snapshots are depicted beginning with snapshot (318), then snapshot (320), then snapshot (322). Snapshot (320) includes a reference (326) to a data object included in snapshot (318). Such a data object is considered a shared data object (324). Snapshot (320) and (322) each include a reference (332, 334) to another shared data object (330) from snapshot (318). All other data (336, 338, 328, 340) in the snapshots is unique to the snapshot.

Each snapshot is considered an 'entity' as described in this specification such that some fractional portion of amount of storage consumed by a data object shared amongst multiple snapshots may be attributed to each of the snapshots sharing that data. In the example of FIG. 3, the snapshot (318) and snapshot (320) share the data object (324) equally. As such, each snapshot will be attributed with half of the total storage space consumed by the shared data object (324). Each snapshot (318, 326, 328) shared the data object (330) equally. As such, each snapshot will be attributed with a third of the total storage space consumed by the shared data object (330).

In another example of FIG. 3, a shared data object includes data shared between a source memory region (312) and a target memory region (314) as a result of a copy operation. Rather than copying data from a source memory region to a target memory region, many embodiments will merely create a reference to the data stored at the source memory region in the target memory region. There many types of copy operations which may result in such shared data. A normal copy operation, an XCOPY or 'extended copy' operation, a duplication of an entire volume, a copy of a snapshot or snapshots, replication between storage arrays over a network and so on are all types of copies which may result in a reference in a target memory region and shared data in a source memory region. To that end, each memory region (source and target) may be attributed a fractional portion of the amount of storage capacity occupied by the data shared between the two memory regions.

Figure 4:
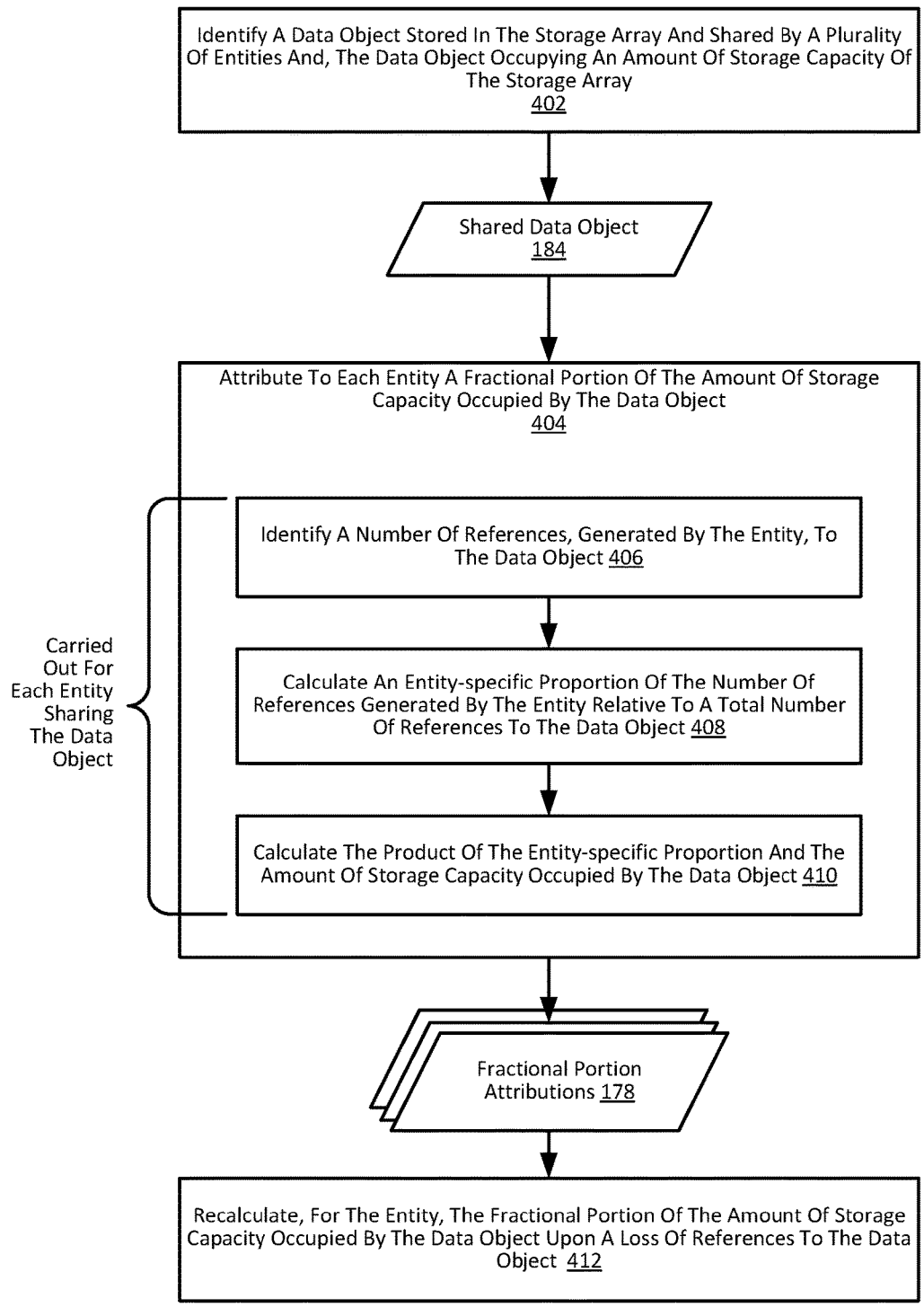
FIG. 4 sets forth a flow chart illustrating an exemplary method of attributing consumed storage capacity among entities storing data in a storage array according to embodiments of the present invention.

FIG. 4 sets forth a flow chart illustrating an exemplary method of attributing consumed storage capacity among entities storing data in a storage array according to embodiments of the present invention. The method of FIG. 4 includes identifying (402) a data object stored (184) in the storage array and shared by a plurality of entities. In the example of FIG. 4, the data object (184) occupies an amount of storage capacity of the storage array. Identifying (402) a data object (184) stored in the storage array and shared by a plurality of entities may be carried out in a variety of ways including by identifying deduplicated data, identifying references to data objects, identifying a copy operation, and so on.

The method of FIG. 4 also includes attributing (404) to each entity a fractional portion (178) of the amount of storage capacity occupied by the data object. In the method of FIG. 4, attributing (404) to each entity a fractional portion of the amount of storage capacity occupied by the data object is carried out, for each entity, by: identifying (406) a number of references, generated by the entity, to the data object; calculating (408) an entity-specific proportion of the number of references generated by the entity relative to a total number of references to the data object; and calculating (410) the product of the entity-specific proportion and the amount of storage capacity occupied by the data object.

Upon a loss of references by the entity to the data object, the method of FIG. 4 includes recalculating (412), for the entity, the fractional portion (178) of the amount of storage capacity occupied by the data object. Recalculating (412) the fractional portion (178) may be carried out in the same way as described above with respect to attributing (404) the fractional portion (178). That is, the recalculation may include, for each entity sharing the data object: identifying (406) a number of references, generated by the entity, to the data object including the updated number of references after the loss of the reference; calculating (408) an entity-specific proportion of the number of references generated by the entity relative to a total number of references to the data object; and calculating (410) the product of the entity-specific proportion and the amount of storage capacity occupied by the data object.

Figure 5:
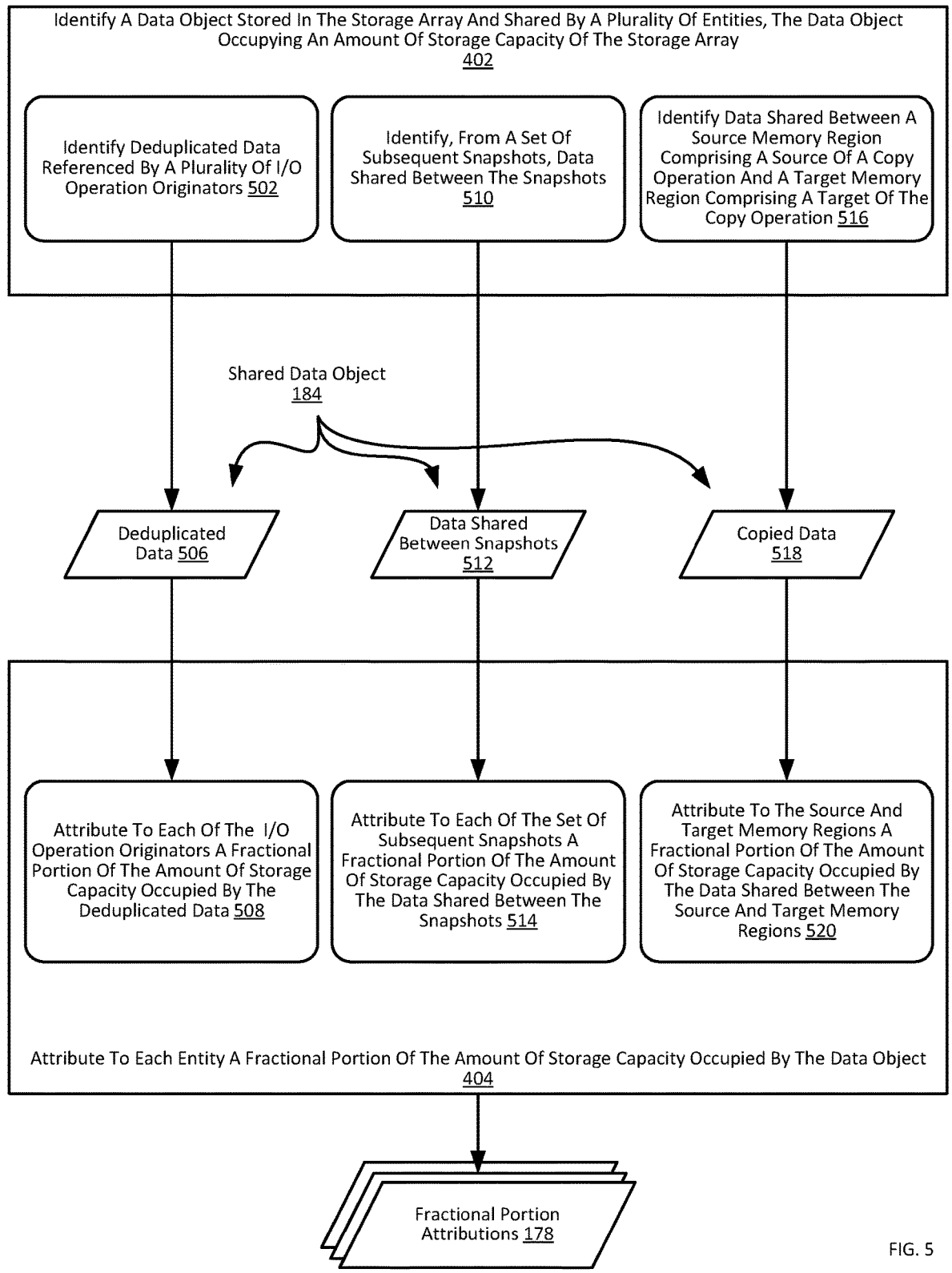
FIG. 5 sets forth a flow chart illustrating another exemplary method of attributing consumed storage capacity among entities storing data in a storage array according to embodiments of the present invention.

FIG. 5 sets forth a flow chart illustrating another exemplary method of attributing consumed storage capacity among entities storing data in a storage array according to embodiments of the present invention. The method of FIG. 5 is similar to the method of FIG. 4 including as it does: identifying (402) a data object stored in the storage array and shared by a plurality of entities and attributing (404) to each entity a fractional portion (178) of the amount of storage capacity occupied by the data object.

The method of FIG. 5 differs from the method of FIG. 4, however, in that in the method of FIG. 5 identifying (402) a data object stored in the storage array and shared by a plurality of entities may be carried out in various ways. For example, identifying (402) a data object shared by a plurality of entities may be carried out by identifying (502) deduplicated data (506) referenced by a plurality of I/O operation originators. Identifying (502) deduplicated data (506) may be carried out by a deduplication engine that reports to an attribution module. For example, upon each deduplication or addition of a reference to a deduplicated data object, the deduplication engine may report the memory location, size of the deduplicated data, number of references, and I/O originators for each reference, to the attribution module. In such an embodiment, attributing (404) to each entity a fractional portion of the amount of storage capacity occupied by the data object includes attributing (508) to each of the I/O operation originators a fractional portion of the amount of storage capacity occupied by the deduplicated data.

Identifying (402) a data object shared by a plurality of entities in the method of FIG. 5 also includes identifying (510), from a set of subsequent snapshots, data shared between the snapshots. A snapshot creator may, upon creation of a snapshot, identify and report the size of data objects shared between snapshots, the number of references for each snapshot that point to the shared data objects, and an identifier of each snapshot that shares the data object. In such an embodiment, attributing (404) to each entity a fractional portion of the amount of storage capacity occupied by the data object is carried out by attributing (514) to each of the set of subsequent snapshots a fractional portion of the amount of storage capacity occupied by the data shared between the snapshots.

Identifying (402) a data object shared by a plurality of entities in the example of FIG. 5 also includes identifying (516) data shared between a source memory region comprising a source of a copy operation and a target memory region comprising a target of the copy operation. Upon each copy operation that results in shared data, a module handling the copy operations may report to an attribution module the identifiers of the target and source memory region and the size of the data shared between the two memory regions. In such an embodiment, attributing (404) to each entity a fractional portion of the amount of storage capacity occupied by the data object is carried out by attributing (520) to the source and target memory regions a fractional portion of the amount of storage capacity occupied by the data shared between the source and target memory regions.

Readers of skill in the art will recognize that although three different embodiments are set forth in the example of FIG. 5, the three different embodiments need not be mutually exclusively. That is, in some embodiments any number of these three embodiments may be employed together. Consider, for example, a number of snapshots with data shared between the snapshot. Consider further that such data shared between the snapshots is deduplicated with other data in the volume. Consider further that a user copies that other data to a from its original memory location (source) to another memory region (target). In each case, fractional apportionment as described above may be carried out. That is, each of these embodiments in the example of FIG. 5 may be combined to create a single fractional attribution for an entity.

Figure 6:
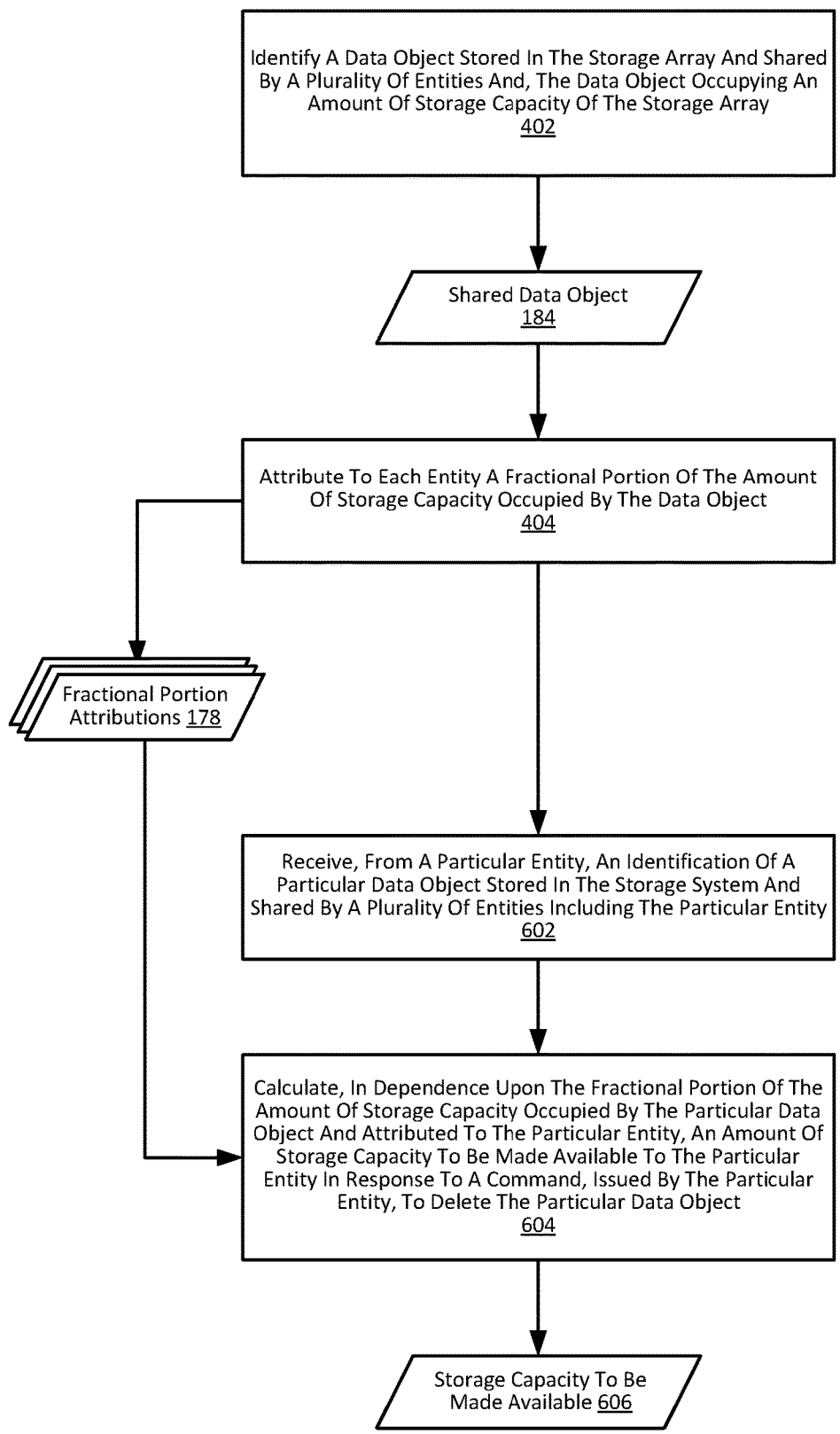
FIG. 6 sets forth a flow chart illustrating another exemplary method of attributing consumed storage capacity among entities storing data in a storage array according to embodiments of the present invention.

FIG. 6 sets forth a flow chart illustrating another exemplary method of attributing consumed storage capacity among entities storing data in a storage array according to embodiments of the present invention. The method of FIG. 6 is similar to the method of FIG. 4 including as it does: identifying (402) a data object stored in the storage array and shared by a plurality of entities and attributing (404) to each entity a fractional portion (178) of the amount of storage capacity occupied by the data object.

The method of FIG. 6 differs from the method of FIG. 4 in that the method of FIG. 6 also includes receiving (602), from a particular entity, an identification of a particular data object stored in the storage system and shared by a plurality of entities including the particular entity. Such an identification may be a request to delete a particular data file or identify the properties of a particular data file such as the data files 'size' on the storage device. To that end, the method of FIG. 6 continues by calculating (604), in dependence upon the fractional portion of the amount of storage capacity occupied by the particular data object and attributed to the particular entity, an amount of storage capacity to be made available to the particular entity in response to a command, issued by the particular entity, to delete the particular data object.

Figure 7:
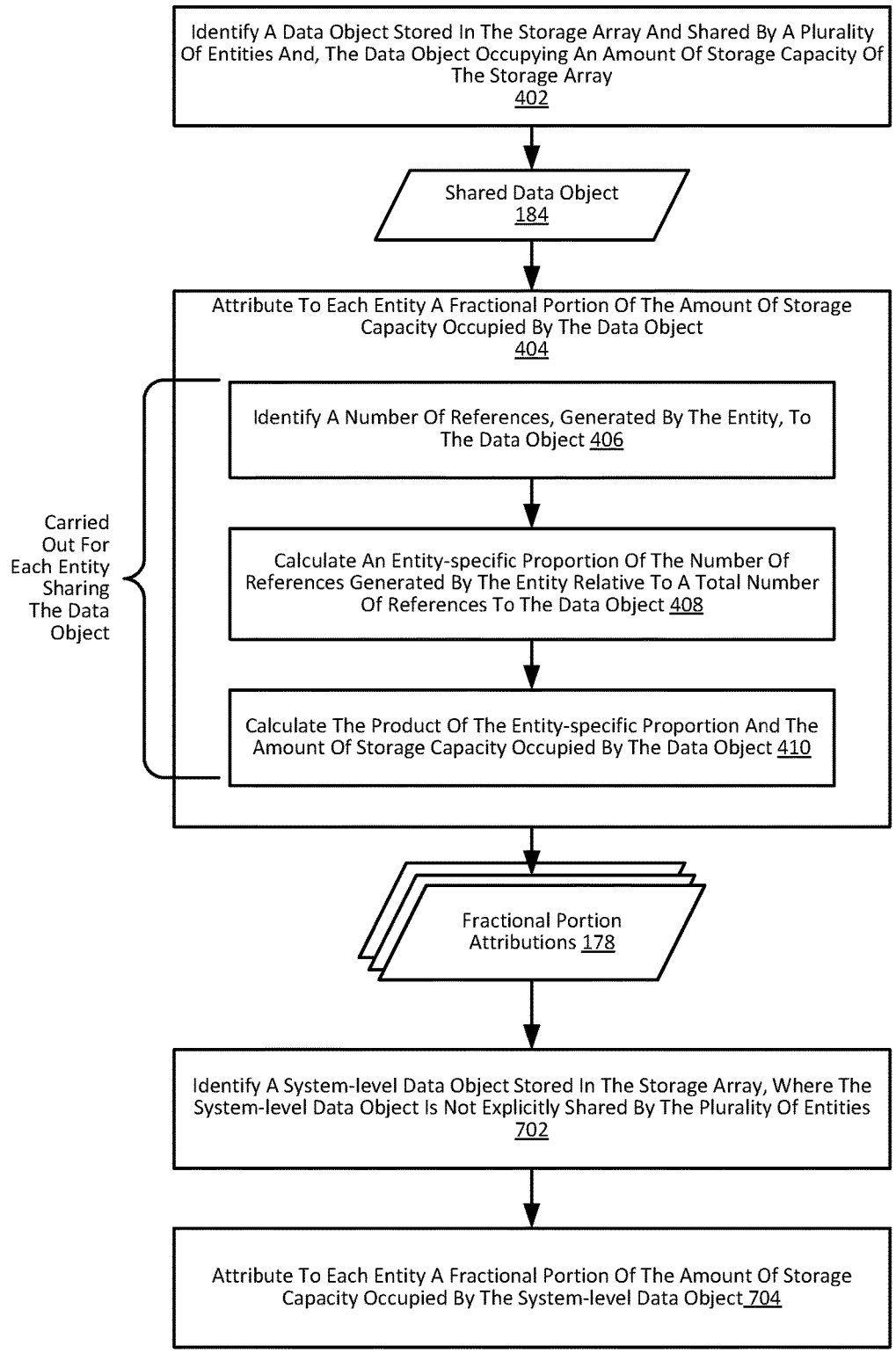
FIG. 7 sets forth a flow chart illustrating another exemplary method of attributing consumed storage capacity among entities storing data in a storage array according to embodiments of the present invention.

FIG. 7 sets forth a flow chart illustrating another exemplary method of attributing consumed storage capacity among entities storing data in a storage array according to embodiments of the present invention. The method of FIG. 7 is similar to the method of FIG. 4 including as it does: identifying (402) a data object stored in the storage array and shared by a plurality of entities and attributing (404) to each entity a fractional portion (178) of the amount of storage capacity occupied by the data object.

The method of FIG. 7 differs from the method of FIG. 4 in that the method of FIG. 7 also includes identifying (702) a system-level data object stored in the storage array. System-level data objects may include various types of metadata. Deduplication tables, garbage collection tables, address translation tables, and the like may all be stored in the storage array and utilized by storage system management software to manage various characteristics of the storage array. That is, the system-level data object is not explicitly shared by the plurality of entities. Instead, each system-level data object is only inherently utilized by the entities through the management of the storage system utilized by the entities. To that end, the method of FIG. 6 continues by attributing (704) to each entity a fractional portion of the amount of storage capacity occupied by the system-level data object. In some embodiments attributing (704) a fractional portion of the amount of storage capacity occupied by the system-level data object may be carried out by attributing an equal portion of that amount to each entity utilizing the storage array.

Exemplary embodiments of the present invention are described largely in the context of a fully functional computer system. Readers of skill in the art will recognize, however, that the present invention also may be embodied in a computer program product disposed upon computer readable media for use with any suitable data processing system. Such computer readable storage media may be any transitory or non-transitory media. Examples of such media include storage media for machine-readable information, including magnetic media, optical media, or other suitable media. Examples of such media also include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware, as hardware, or as an aggregation of hardware and software are well within the scope of embodiments of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of attributing consumed storage capacity among entities storing data in a storage array, the method comprising:
   identifying a data object stored in the storage array and shared by a plurality of entities, the data object occupying an amount of storage capacity of the storage array, including identifying data shared between a source memory region comprising a source of a copy operation and a target memory region comprising a target of the copy operation; and
   attributing to each entity a fractional portion of the amount of storage capacity occupied by the data object, including attributing to the source and target memory regions a fractional portion of the amount of storage capacity occupied by the data shared between the source and target memory regions.

2. The method of claim 1, wherein attributing to each entity a fractional portion of the amount of storage capacity occupied by the data object further comprises:
   for each entity:
   identifying a number of references, generated by the entity, to the data object;
   calculating an entity-specific proportion of the number of references generated by the entity relative to a total number of references to the data object; and calculating the product of the entity-specific proportion and the amount of storage capacity occupied by the data object.

3. The method of claim 2 further comprising, upon a loss of references by the entity to the data object, recalculating, for the entity, the fractional portion of the amount of storage capacity occupied by the data object.

4. The method of claim 1, wherein:
attributing to each entity a fractional portion of the amount of storage capacity occupied by the data object further comprises attributing to each of the I/O operation originators a fractional portion of the amount of storage capacity occupied by deduplicated data referenced by a plurality of I/O operation originators.

5. The method of claim 1, wherein:
identifying a data object shared by a plurality of entities further comprises identifying, from a set of subsequent snapshots, data shared between the snapshots.

6. The method of claim 1 further comprising:
calculating, in dependence upon the fractional portion of the amount of storage capacity occupied by a particular data object and attributed to a particular entity, an amount of storage capacity to be made available to the particular entity in response to a command, issued by the particular entity, to delete the particular data object.

7. The method of claim 1 further comprising:
identifying a system-level data object stored in the storage array, wherein the system-level data object is not explicitly shared by the plurality of entities; and
attributing to each entity a fractional portion of the amount of storage capacity occupied by the system-level data object.

8. The method of claim 5 wherein attributing to each entity a fractional portion of the amount of storage capacity occupied by the data object further comprises attributing to each of the set of subsequent snapshots a fractional portion of the amount of storage capacity occupied by the data shared between the snapshots.

9. An apparatus for attributing consumed storage capacity among entities storing data in a storage array, the apparatus comprising a computer processor, a computer memory operatively coupled to the computer processor, the computer memory having disposed within it computer program instructions that, when executed by the computer processor, cause the apparatus to carry out the steps of:
identifying a data object stored in the storage array and shared by a plurality of entities, the data object occupying an amount of storage capacity of the storage array, including identifying data shared between a source memory region comprising a source of a copy operation and a target memory region comprising a target of the copy operation; and
attributing to each entity a fractional portion of the amount of storage capacity occupied by the data object, including attributing to the source and target memory regions a fractional portion of the amount of storage capacity occupied by the data shared between the source and target memory regions.

10. The apparatus of claim 9, wherein attributing to each entity a fractional portion of the amount of storage capacity occupied by the data object further comprises:
for each entity:
identifying a number of references, generated by the entity, to the data object;
calculating an entity-specific proportion of the number of references generated by the entity relative to a total number of references to the data object; and
calculating the product of the entity-specific proportion and the amount of storage capacity occupied by the data object.

11. The method of claim 10 further comprising computer program instructions that, when executed, cause the apparatus to carry out the step of: upon a loss of references by the entity to the data object, recalculating, for the entity, the fractional portion of the amount of storage capacity occupied by the data object.

12. The apparatus of claim 9, wherein:
attributing to each entity a fractional portion of the amount of storage capacity occupied by the data object further comprises attributing to each of the I/O operation originators a fractional portion of the amount of storage capacity occupied by deduplicated data referenced by a plurality of I/O operation originators.

13. The apparatus of claim 9, wherein:
identifying a data object shared by a plurality of entities further comprises identifying, from a set of subsequent snapshots, data shared between the snapshots.

14. The apparatus of claim 9 further comprising computer program instructions that, when executed, cause the apparatus to carry out the steps of:
calculating, in dependence upon the fractional portion of the amount of storage capacity occupied by a particular data object and attributed to a particular entity, an amount of storage capacity to be made available to the particular entity in response to a command, issued by the particular entity, to delete the particular data object.

15. The apparatus of claim 9 further comprising computer program instructions that, when executed, cause the apparatus to carry out the steps of:
identifying a system-level data object stored in the storage array, wherein the system-level data object is not explicitly shared by the plurality of entities; and
attributing to each entity a fractional portion of the amount of storage capacity occupied by the system-level data object.

16. The apparatus of claim 9 wherein attributing to each entity a fractional portion of the amount of storage capacity occupied by the data object further comprises attributing to each of the set of subsequent snapshots a fractional portion of the amount of storage capacity occupied by the data shared between the snapshots.

17. A computer program product for attributing consumed storage capacity among entities storing data in a storage array, the computer program product disposed upon a non-transitory computer readable medium, the computer program product comprising computer program instructions that, when executed, cause a computer to carry out the steps of:
identifying a data object stored in the storage array and shared by a plurality of entities, the data object occupying an amount of storage capacity of the storage array, including identifying data shared between a source memory region comprising a source of a copy operation and a target memory region comprising a target of the copy operation; and
attributing to each entity a fractional portion of the amount of storage capacity occupied by the data object, including attributing to the source and target memory regions a fractional portion of the amount of storage capacity occupied by the data shared between the source and target memory regions.

18. The computer program product of claim 17, wherein:
attributing to each entity a fractional portion of the amount of storage capacity occupied by the data object further comprises attributing to each of the I/O operation originators a fractional portion of the amount of storage capacity occupied by deduplicated data referenced by a plurality of I/O operation originators.

19. The computer program product of claim 17, wherein: identifying a data object shared by a plurality of entities further comprises identifying, from a set of subsequent snapshots, data shared between the snapshots.

20. The computer program product of claim 19 wherein attributing to each entity a fractional portion of the amount of storage capacity occupied by the data object further comprises attributing to each of the set of subsequent snapshots a fractional portion of the amount of storage capacity occupied by the data shared between the snapshots.

* * * * *